US011077776B2

(12) United States Patent
Longatte et al.

(10) Patent No.: US 11,077,776 B2
(45) Date of Patent: Aug. 3, 2021

(54) VEHICLE SEAT AND SEAT ELEMENT EQUIPPED WITH A VENTILATION AND THERMAL CONTROL SYSTEM

(71) Applicant: Faurecia Sieges d'Automobile, Nanterre (FR)

(72) Inventors: Florent Longatte, Rambouillet (FR); Mathieu Cluet, Etampes (FR); Didier Duriez, Le Plessis-Pate (FR)

(73) Assignee: FAURECIA SIÈGES D'AUTOMOBILE, Nanterre (FR)

( * ) Notice: Subject to any disclaimer, the term of this patent is extended or adjusted under 35 U.S.C. 154(b) by 71 days.

(21) Appl. No.: 16/240,243

(22) Filed: Jan. 4, 2019

(65) Prior Publication Data

US 2019/0210494 A1  Jul. 11, 2019

(30) Foreign Application Priority Data

Jan. 5, 2018  (FR) ..................................... 18 50089

(51) Int. Cl.
*B60N 2/56*  (2006.01)
(52) U.S. Cl.
CPC ........... *B60N 2/565* (2013.01); *B60N 2/5678* (2013.01); *B60N 2/5692* (2013.01)
(58) Field of Classification Search
CPC .... B60N 2/565; B60N 2/5678; B60N 2/5685; B60N 2/5692
See application file for complete search history.

(56) References Cited

U.S. PATENT DOCUMENTS

| | | | | |
|---|---|---|---|---|
| 5,924,766 A | * | 7/1999 | Esaki | A47C 7/74 297/180.13 |
| 6,196,627 B1 | * | 3/2001 | Faust | B60N 2/5635 297/180.1 |
| RE38,128 E | * | 6/2003 | Gallup | A47C 7/74 62/261 |
| 7,287,812 B2 | * | 10/2007 | Ishima | B60N 2/5635 297/180.14 |
| 7,647,780 B2 | * | 1/2010 | Aoki | B60H 1/00285 62/239 |
| 10,160,355 B2 | * | 12/2018 | Morariu | B60N 2/565 |

(Continued)

FOREIGN PATENT DOCUMENTS

WO  WO2015123585 A1  8/2015
WO  WO2017066244 A1  4/2017

OTHER PUBLICATIONS

French Search Report for Application No. FR 1850089, dated Sep. 19, 2018, 2 pages.

(Continued)

*Primary Examiner* — David R Dunn
*Assistant Examiner* — Tania Abraham
(74) *Attorney, Agent, or Firm* — Reising Ethington P.C.

(57) ABSTRACT

A seat element having a cover and padding configured to serve as support for a user, and having a ventilation and thermal control system that includes a thermoelectric module, a blower, and a conduit delimiting a passage for air connecting the blower and the thermoelectric module. The ventilation and thermal control system is configured for passing a flow of air coming from the cover towards the blower, and the thermoelectric module is configured for cooling and/or heating the airflow.

13 Claims, 10 Drawing Sheets

(56) References Cited

U.S. PATENT DOCUMENTS

| | | | | |
|---|---|---|---|---|
| 2007/0040421 A1* | 2/2007 | Zuzga | ................ | B60N 2/5657 |
| | | | | 297/180.13 |
| 2010/0300644 A1* | 12/2010 | Chung | ................ | B60N 2/5678 |
| | | | | 165/41 |
| 2017/0164757 A1 | 6/2017 | Thomas et al. | | |
| 2017/0181225 A1 | 6/2017 | Inaba et al. | | |
| 2018/0111527 A1* | 4/2018 | Tait | ................ | B60N 2/5678 |

OTHER PUBLICATIONS

Written Opinion for French Application No. FR 1850089, dated Jan. 5, 2018, 4 pages.

\* cited by examiner

VEHICLE SEAT AND SEAT ELEMENT EQUIPPED WITH A VENTILATION AND THERMAL CONTROL SYSTEM

FIELD OF THE INVENTION

The invention relates to a vehicle seat and a seat element equipped with a ventilation and thermal control system. In particular, the ventilation and thermal control system can be a ventilation and cooling system. The ventilation system is in this case an aspirating type and the cooling system is a thermoelectric type. The ventilation and thermal control system can further be a ventilation and heating system.

BACKGROUND OF THE INVENTION

A vehicle generally comprises several seats connected to a floor of the vehicle. A vehicle seat usually comprises at least two seat elements: a seat bottom and a seat back. The seat element comprises a bearing structure and padding. The bearing structure is stiff and directly or indirectly connected to the floor. The function of the bearing structure is to provide mechanical stability for the seat element. The padding is soft and is arranged between the bearing structure and a user of the seat element. Thus, the padding provides for the comfort of the user. It is generally covered with a cover.

The seat element can also comprise the ventilation system connected with the padding. The ventilation system comprises at least one blower, which is able to blow or draw air into or from a vehicle passenger compartment and to do so through the cover and the padding.

In particular it was observed that, in comparison to blowing air, drawing air from the vehicle passenger compartment is particularly advantageous in terms of managing moisture, in particular resulting from the sweat of the vehicle seat occupant.

However, since the aspirated air comes from the vehicle passenger compartment, the temperature of this aspirated air is identical to that of the air in the passenger compartment. The temperature of this aspirated air can even be higher than that of the passenger compartment because of the presence of a user in contact with the seat element. Because of this, the seat, and in particular the seat cover, is not sufficiently cooled based on the temperature conditions of the passenger compartment air.

However, in particular for reasons of comfort and occupant preferences, it is sometimes desirable that the seat be cooled, meaning that the seat have a lower temperature than that obtained solely with the air from the compartment.

There are systems for this purpose able to cool a vehicle seat. For example, ventilation systems are known comprising one or more thermoelectric modules making use of the Peltier effect. This type of module, placed in the vehicle seat, is generally flat and comprises a cold surface and a hot surface opposite the cold surface. The temperature difference between the two surfaces depends on the electric current injected in the module and also the direction of this current, so that the temperatures of the two surfaces can be reversed.

In an operating mode for cooling the seat, a blower is provided for blowing the air cooled by the cold surface of the thermoelectric module towards the seat occupant, through the padding and cover. In that way the vehicle cover can be cooled by the thermoelectric module. It is however necessary to provide a mechanism for removal of the heat from the hot surface. This is provided by the same blower. The blower thus blows air towards the hot surface of the thermoelectric module as well. The hot air is then removed from the seat under the seat bottom or behind the seatback. In other words, the hot air is removed from the passenger compartment.

However, this type of ventilation system by blowing air towards the occupant is not able to effectively manage the humidity resulting from the presence of the occupant on the seat. Further, the flow of air from the blower is not entirely used for ventilating the occupant, either the blower must be oversized, resulting in an increase of the sound level of the system to provide the ventilation of the occupant, or else a low ventilation level must be accepted. Further, in an operating mode for heating the seat, the blower is provided for blowing air heated by the hot surface of the thermoelectric module. However, it was observed that the effectiveness of such a system based on convection is poor compared to the traditional system based on conduction through heating layers placed under the seat cover.

OBJECTS AND SUMMARY OF THE INVENTION

A goal of the invention is to provide a ventilation and thermal control system not having at least some of the disadvantages of the devices from the prior art.

For this purpose, in at least some embodiments the invention provides a seat element comprising a cover and padding configured to serve as support for a user and a ventilation and thermal control system, where the ventilation and thermal control system comprise at least one thermoelectric module, a blower, and a conduit delimiting a passage for air connecting the blower and the thermoelectric module, where the ventilation and thermal control system is configured for passing a flow of air coming from the cover towards the blower, and where the thermoelectric module is configured for cooling and/or heating the airflow.

The cooling or heating of the seat element can thus be effectively managed with the ventilation and thermal control system. When the ventilation and thermal control system is a ventilation and cooling system, the cooling can be effectively managed by it while removing moisture present between the cover and the occupant.

During inversion of the electric current, a system of heating by conduction is also possible.

According to preferred embodiments, the seat element has one or more of the following features:

- The thermoelectric module is suited at least for heating the airflow;
- The thermoelectric module is suited at least for cooling the airflow;
- The thermoelectric module is configured for operating selectively according to two modes of operation: a heating mode where the thermoelectric module heats the airflow and a cooling mode where the thermoelectric module cools the airflow;
- The seat element comprises at least one heat exchanger able to improve heat exchanges between the thermoelectric module and the airflow;
- The heat exchanger is disposed in the conduit and the thermoelectric module is disposed between the heat exchanger and the padding (12);
- The heat exchanger is disposed in the padding connected with the orifices of the conduit, and the thermoelectric module is disposed between the heat exchanger and the cover;

The heat exchanger comprises a housing receiving the thermoelectric module;

The ventilation and thermal control system comprises two thermoelectric modules and two heat exchangers where each of the two thermoelectric modules is respectively in contact with one of the heat exchangers;

The seat element forms a seat bottom;

The seat element forms a seatback.

According to another aspect, the invention relates to a vehicle seat comprising a seat element according to one of the above-identified embodiments of the invention.

BRIEF DESCRIPTION OF THE DRAWINGS

Other features and advantages of the present invention will be seen in the following detailed description, referring to the attached drawings in which.

DETAILED DESCRIPTION

Figure 1:
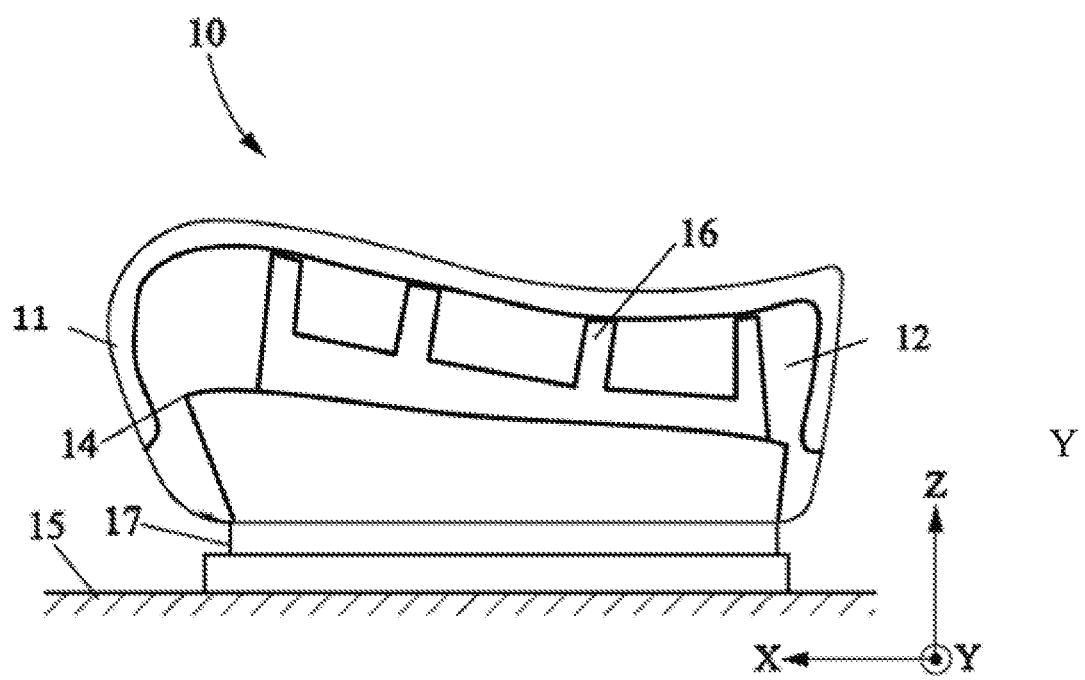
FIG. 1 shows a section view of a seat element according to an embodiment of the invention.

FIG. 1 shows the seat element 10 in section view according to an embodiment of the invention. For example, the seat element 10 shown in FIG. 1 is a seat bottom for a vehicle.

A direction X is shown in FIG. 1 which goes from the rear of the vehicle towards the front when the seat element 10 is placed in the vehicle. A vertical direction Z is also shown which goes from the bottom to the top, and a direction Y that is perpendicular to these two directions X and Z and which goes from the right of the vehicle to the left. Observe that the XZ plane is a plane of symmetry for the seat element 10.

The seat element 10 in particular comprises a cover 11, padding 12, a bearing structure 14 and a ventilation and thermal control system 16.

The padding 12 is soft and configured to serve to support a user.

The cover 11 represents the surface of the seat element 10 which is in contact with the user. The cover 11 has an outer and inner surface. The outer surface is generally of perforated leather but it can also be a material permeable to air. The inner surface has for example a cross-linked foam allowing the diffusion of air coming from the ventilation system 16.

The padding 12 can have a diffusive layer on its outer surface, meaning the surface in contact with the cover 11, in particular when the active surface of the thermoelectric module 20 is reduced compared to the surface to be dealt with by the cover 11. The goal of this diffusive layer is to provide heat exchange over the largest surface area of the seat element 10 possible. The diffusive layer is thin, for example less than a millimeter, and has a surface area included between 200 cm$^2$ to 900 cm$^2$. It is a made of a material having a high thermal conductivity. This material can be graphene, but also copper, silver or alloys.

The bearing structure 14 gives the seat element 10 the necessary structural strength. Further, the bearing structure 14 can be connected to a vehicle passenger compartment floor 15 via slides 17, for example. The bearing structure 14 can be of any type and can in particular comprise a metal frame.

Figure 2:
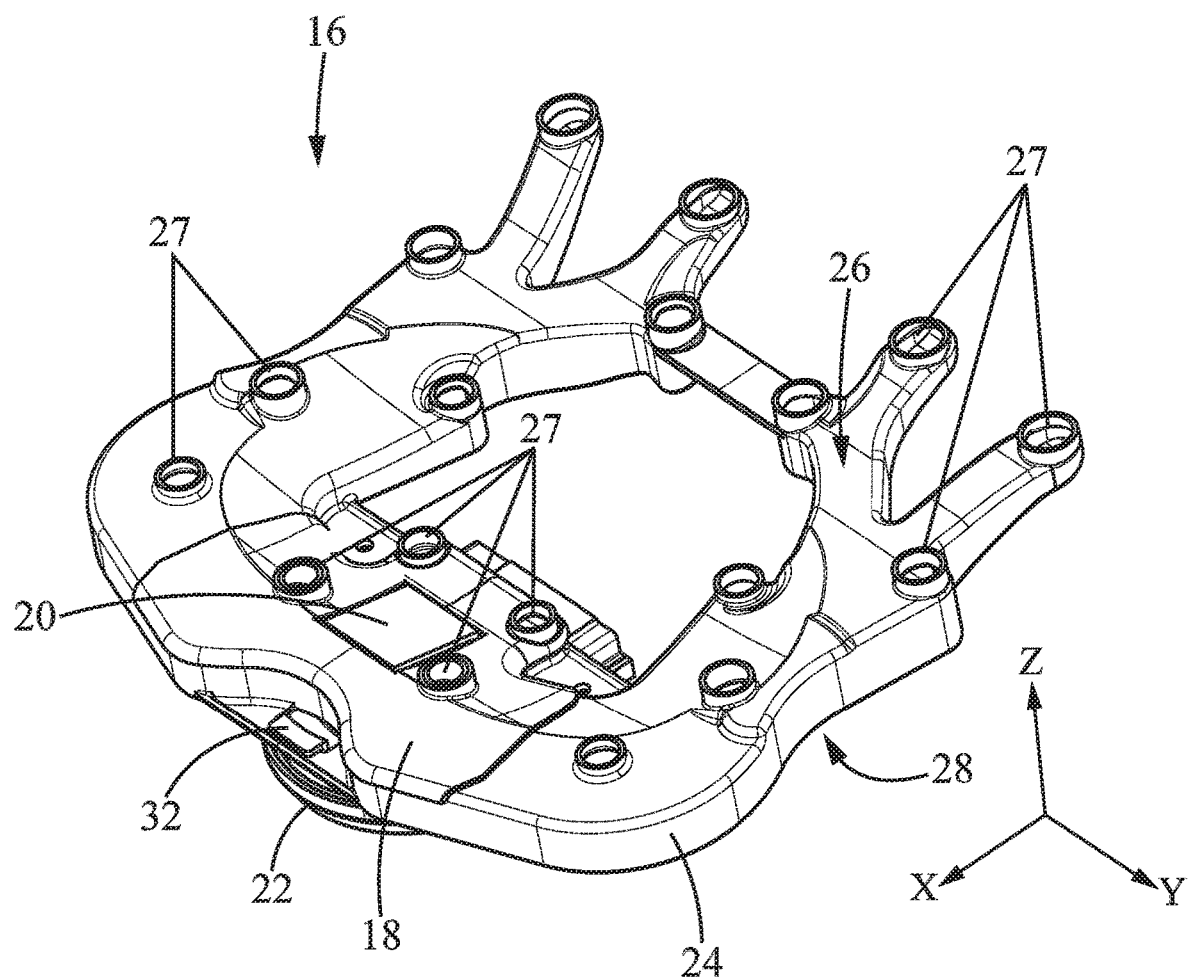
FIG. 2 shows a top perspective view of the ventilation and thermal control system used in the seat element of FIG. 1.

According to an example, such as shown in FIG. 2, the ventilation system 16 comprises a heat exchanger 18, a thermoelectric module 20, a blower 22 and a conduit 24.

The seat element 10 can be ventilated with the ventilation and thermal control system 16. Further with such a system the seat element 10 can be cooled or heated. More precisely, when the ventilation and thermal control system 16 cools the seat element 10, the ventilation and thermal control system 16 is described as ventilation and cooling system. Similarly, when the ventilation system 16 heats the seat element 10, the ventilation and thermal control system 16 is described as ventilation and heating system. This ventilation and thermal control system 16 thus contributes to the user's comfort.

The conduit 24 connects the blower 22 with the other elements of the ventilation thermal control system 16, the padding 12 and cover 11.

The conduit 24 can be formed of a polymer material, for example a thermoformed polyethylene foam or polypropylene loaded or not with an elastomer in order to reduce the stiffness thereof, thus providing a good mechanical strength to the conduit 24 while also providing a satisfactory level of suppleness for the good comfort of the occupants.

The material can also comprise a portion of thermoformed nonwoven material. Thus, the conduit 24 formed of a flexible material is able to deform elastically when the user exerts a pressure on the padding. Further, the flexible material has the property of absorbing mechanical vibrations produced by the blower 22 when it is fixed directly on the conduit 24. Thus, the comfort felt by the user of the seat element 10 is increased. Further, the ventilation thermal control system 16 of the seat element 10 can be added during foaming of the padding 12. Subsequently, the seat element 10 is simpler to fabricate and shape.

Figure 4:
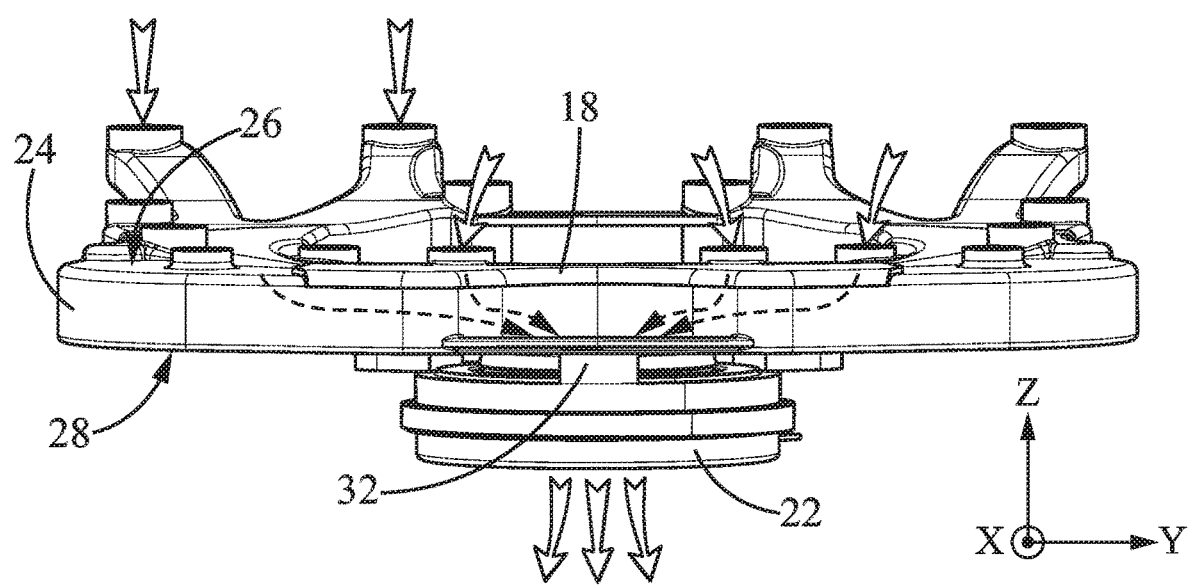
FIG. 4 shows a side view of the ventilation and thermal control system used in the seat element of FIG. 1.

As shown in FIG. 4, the conduit 24 has an upper surface 26 and a lower surface 28, according to the vertical direction Z.

The upper surface 26 shown in FIG. 2 is oriented towards the cover 11. The upper surface 26 is in contact with the heat exchanger 18. The upper surface 26 comprises orifices 27. The orifices 27 connect the outside and inside of the conduit 24. The orifices 27 are disposed on the upper surface of the conduit 26 so as to uniformly distribute the aspirated air near the cover 11.

Figure 3:
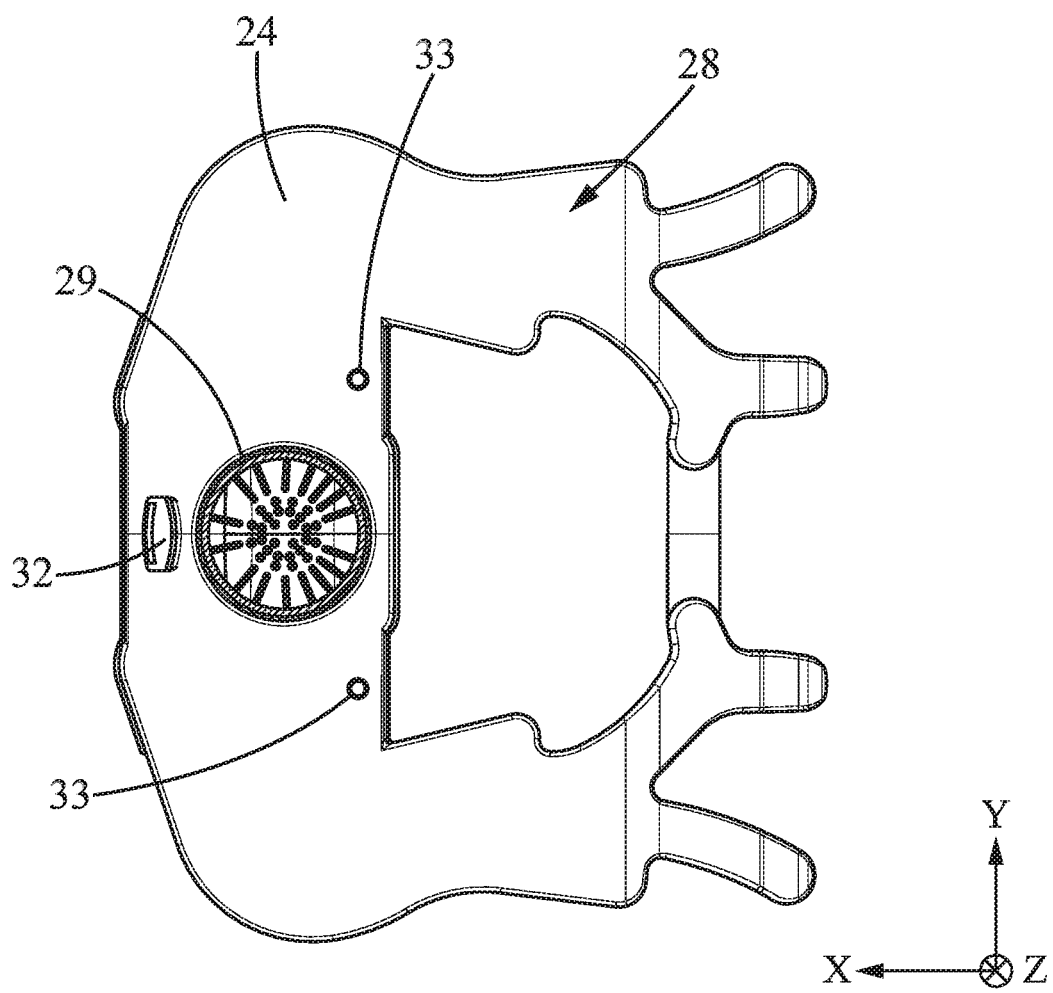
FIG. 3 shows a bottom view of the ventilation and thermal control system used in the seat element of FIG. 1, with its blower removed.

The lower surface 28 shown in FIG. 3 is oriented towards the floor of the vehicle passenger compartment 15 when the seat element 10 is the seat bottom. As a variant, when the seat element of seat 10 is a seatback (not shown), the lower surface 28 is oriented towards the back of the seat. The lower surface 28 is in contact with the blower 22. The lower surface 28 further has a circular opening 29. The circular opening 29 is provided for connecting the inside of the conduit 24 and the blower 22. In this example, the circular opening 29 also delimits an air passage connecting the blower 22 and the heat exchanger 18.

According to an example, the blower 22 is fixed to the conduit 24 by attachment means. The attachment means can for example be a lug 30 and a clip point 32. The conduit 24 has two complementary members 33 respectively of the two lugs 30 and of the clip point 32. The blower 22 is thus fixed to the conduit 24. The blower 22 has a circular shape while being relatively flat. The diameter of the blower is 100 mm, for example.

The direction of the airflow is oriented from the occupant towards the cover 11, then towards the conduit 26, heat exchanger 18 and then the blower 22. This system is an aspirating system so that both the humidity between the occupant and the cover 11 can be evacuated and also the heat exchanger 18 cooled by forced convection.

Figure 5:
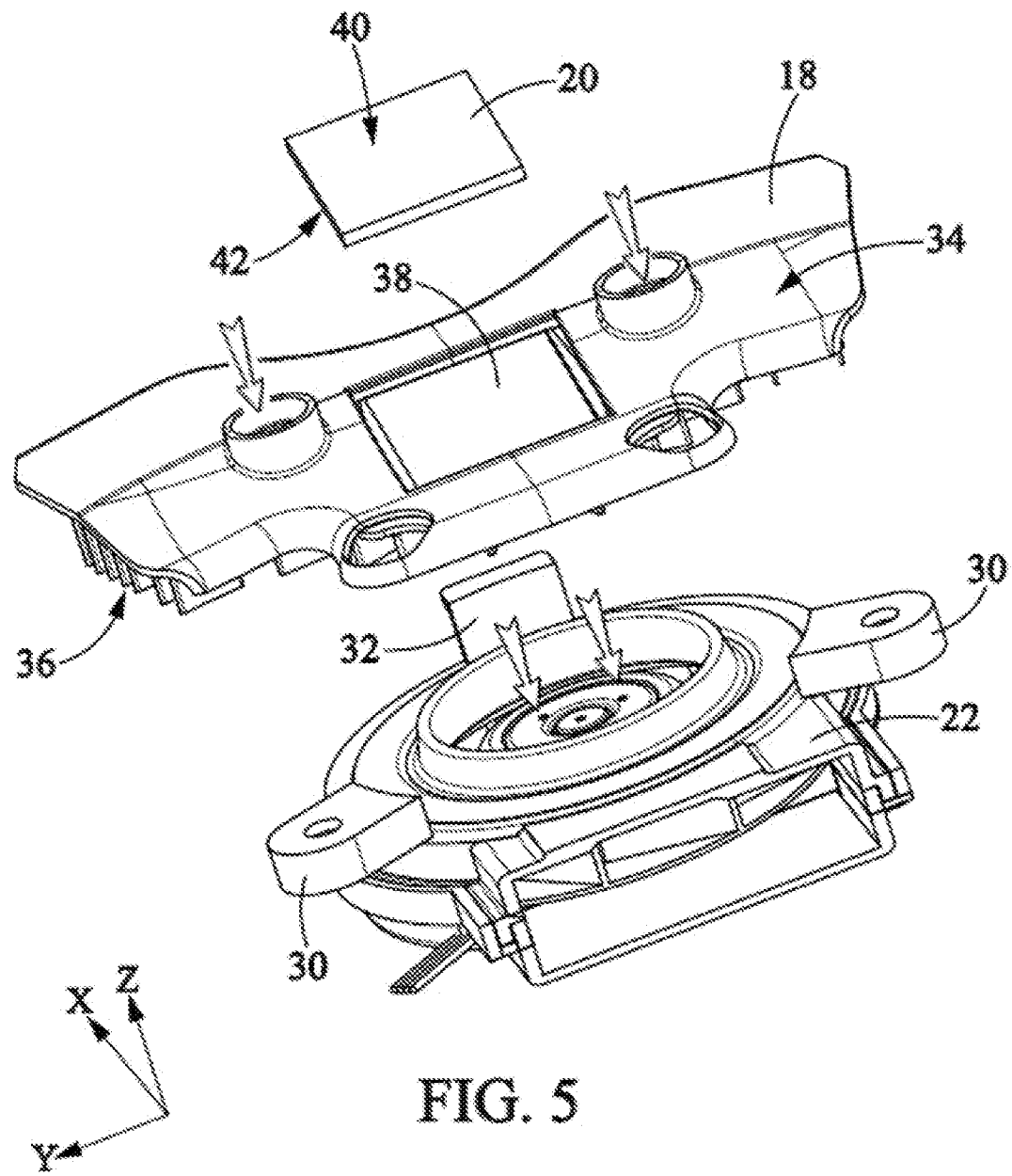
FIG. 5 shows an exploded view of the ventilation and thermal control system used in the seat element of FIG. 1, with its conduit removed.

Further, the thermoelectric module 20, as shown for example in FIGS. 2 and 5, transforms an electric current into a temperature difference. More specifically, the thermoelectric module 20 makes use of thermal electricity, and in particular the Peltier effect (meaning the thermoelectric effect consisting of a physical phenomenon of heat movement in the presence of an electric current). The thermoelectric module 20 is powered by current and has two surfaces, the one cold and the other hot. Depending on the direction of the electric current, the cold surface becomes hot and the hot surface becomes cold.

For example, the thermoelectric module 20 takes the shape of a thin, square-shaped element. For example, the thermoelectric module 20 is a rigid type. The thermoelectric module is further a square plate, 30 mm on the side. According to another example, the thermoelectric module 20 is a square plate, 40 mm on the side. The thermoelectric module 20 has an upper surface 40 and a lower surface 42.

The upper surface 40 of the thermoelectric module 20 is in contact with the padding 12. More precisely, the thermoelectric module 20 is in contact with the diffusive surface of the padding 12. The lower surface 42 is in contact with the heat exchanger 18.

When the cover 11 must be cooled, the thermoelectric module 20 is in cooling mode: the hot surface of the thermoelectric module 20 is the lower surface 42 and the cold surface is the upper surface 40. Inversely, when the cover 11 must be warmed, the thermoelectric module 20 is in heating mode: the hot surface of the thermoelectric module 20 is the upper surface 40 and the cold surface is the lower surface 42. The inversion of the hot/cold surface is done by inverting the direction of the electric current.

The thermoelectric module 20 has the advantage of simple construction. Further, the thermoelectric module 20 does not require the use of refrigerant. The thermoelectric module 20 also has the advantage of not producing noise during operation, or vibration, since it does not have any moving parts. However, when the thermoelectric module is used in order to cool the cover 11, the thermal calories from the hot surface (lower surface 42) of the thermoelectric module must be removed. To do that, the air coming from the cover 11 is drawn by the blower 22. Thus, the combined action of the blower 22 and the thermoelectric module 20 can cool the cover 11 and also remove the humidity between the occupant in the cover 11.

Further, the combined action of the thermoelectric module 20 and the specific diffusive layer of the padding 12 spreads the cold from the cold surface (upper surface 40) to the cover 11 and does so particularly effectively over a wider surface than that of the thermoelectric module 20.

We now describe a heat exchanger 18 example (FIGS. 5 and 6) and integration thereof directly in the conduit (FIGS. 2, 3 and 4).

The heat exchanger 18 is designed so as to improve the cooling of the hot surface of the thermoelectric module 20, where the hot surface corresponds to the lower surface 42 of the thermoelectric module 20 when the cover 11 must be cooled. More specifically, the heat exchanger 18 serves to evacuate calories coming from the hot surface of the thermoelectric module 20 and thus serves the good operation of the thermoelectric module 20. To do that, the heat exchanger 18 is in the airflow coming from the cover 11 and in this example, the heat exchanger 18 is placed inside the conduit 24.

This heat exchanger 18 comprises a central element 37 and two lateral parts. The central element 37 is for example made of a copper or copper alloy material. According to another example, the central element 37 is made of an aluminum alloy material. This type of material has the advantage of improving the thermal conductivity within the heat exchanger 18.

Further, the heat exchanger 18 comprises an upper part 34. The upper part 34 is oriented towards the padding 12. For example, the upper part 34 is in contact with the padding 12. The upper part 34 closes the conduit 24 and thus provides the seal thereof. This upper part 34 is of the same material as the conduit 24 but could be of the same material as the central element 37.

The heat exchanger 18 is disposed in the conduit 24 under the padding 12. In particular, as can be seen in more detail in FIG. 5, the heat exchanger 18 is arranged above the blower 22 in the vertical direction Z. Thus the heat exchanger 18 is placed directly in the airflow produced by the blower 22, thus serving to improve the cooling of the hot surface of the Peltier 20 by forced convection.

Orifices 19 can pass through the heat exchanger 18 in the vertical direction Z. The orifices 19 engage with the orifices 27 of the conduit 24 and serve to ventilate the cover 11.

The central element 37 in this example faces the circular opening 29 of the lower surface 28 of the conduit 22.

Further, the upper part 34 comprises a housing 38. The housing 38 is able to receive thermoelectric module 20. The lower surface 42 of the thermoelectric module 20 rests in the housing 38. The lower surface 42 is therefore in contact with the central element 37 while the upper surface 40 of the thermoelectric module 20 is in contact with the diffusive layer of the padding 12. In order to improve the thermal transfer in the area of the two surfaces of the thermoelectric module, a thermal paste or adhesive is used between the lower surface 42 and the central element 37 and also between the upper surface 40 and the diffusive surface of the padding 12.

Figure 6:
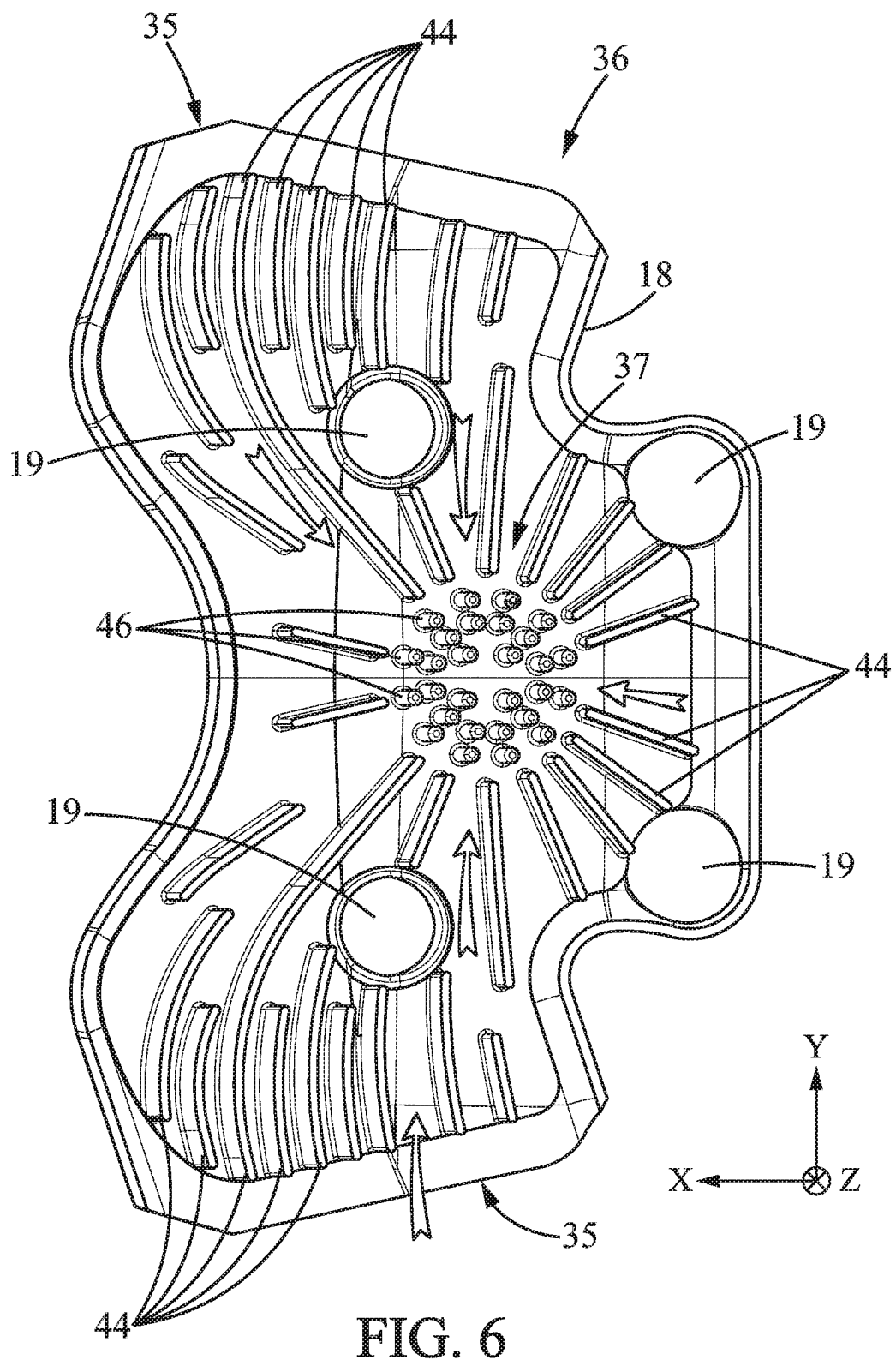
FIG. 6 shows a bottom view of a thermal dissipator used in the seat element of FIG. 1.

The central element 37 shown in detail in FIG. 6 comprises surfaces for exchange with the air. More precisely, these exchange surfaces can be fins 44 serving to increase the surface area for exchange with the air drawn by the blower 22. Further, the fins 44 are drawn so as to not disturb the airflow through the conduit 24. Near the axis of the blower 22, these fins 44 can be replaced by stems 46 which serve to increase the surface for exchange between the air and the heat exchanger 18 without disturbing the flow of air entering the blower 22. The fins 44 and the stems 46 project from the lower surface 36 towards the floor of the vehicle 15 passenger compartment.

The stems 46 are arranged in the area facing the blower 22. More specifically, the stems 46 are distributed in the central element 37. Because of this, the stems 46 are arranged opposite the blower 22. The fins 44 are distributed according to an overall concentric pattern from the lateral parts 35 of the heat exchanger 18 towards the stems 46. The fins 44 are each in different sizes. This distinctive feature contributes to the improvement of the heat exchange within the heat exchanger 18.

The heat exchanger 18 does not have mobile elements. The heat exchanger 18 is thus particularly advantageous because it does not lead to noise due to its operation, nor to vibrations. In other words, the heat exchanger 18 is a passive element.

We now describe the airflow, shown by arrows in the figures, through the ventilation system 16 when the cover 11 of the seat element 10 in contact with the user must be cooled.

Generally, the air is drawn from the cover 11, then the padding 12 towards the bearing structure 14.

More precisely, the blower 22 creates an aspiration of the air between the cover 11 and the occupant of the seat 10. The aspirated air enters into the conduit 24 through the orifices 27 and 19. Further this aspirated air is going to come into contact with the central element 37 and the fins 44 of the heat exchanger 18 and thus cool the heat exchanger 18. Finally, the air passes the blower 22 and is directed towards the floor of the vehicle passenger compartment 15. Thus the air drawn from the cover 11 is used to cool the heat exchanger 18 and thus cool the lower surface 40 of the thermoelectric module 20 thus providing for its good operation.

The presence of the thermoelectric module 20 thus allows the effective cooling of the seat element 10. Cooling of the hot surface thereof is provided through the ventilation and thermal control system 16. By drawing air from the cover 11, the ventilation and thermal control system 16 further provides a good management of the humidity resulting from the presence of the occupant on the seat. This is particularly advantageous, allowing both for evacuating moisture and in particular sweat from the occupant with the ventilation and thermal control system 16 and also cooling the surface of contact with the occupant by the presence of the thermoelectric module 20 without having to add another way to cool the hot surface of the thermoelectric module 20.

Depending on the temperature in the passenger compartment and the occupant's preferences, the occupant can therefore activate the following functions:

Only the ventilation of the seat;
Ventilation of the seat with cooling by the electric supply to the thermoelectric module;
Just heating of the seat by the inversion of the supply to the thermoelectric module;
Heating of the seat with ventilation of the seat.

The invention is not limited to only the example shown and variants are easily accessible to the person skilled in the art, taken alone or in combination.

Figure 7:
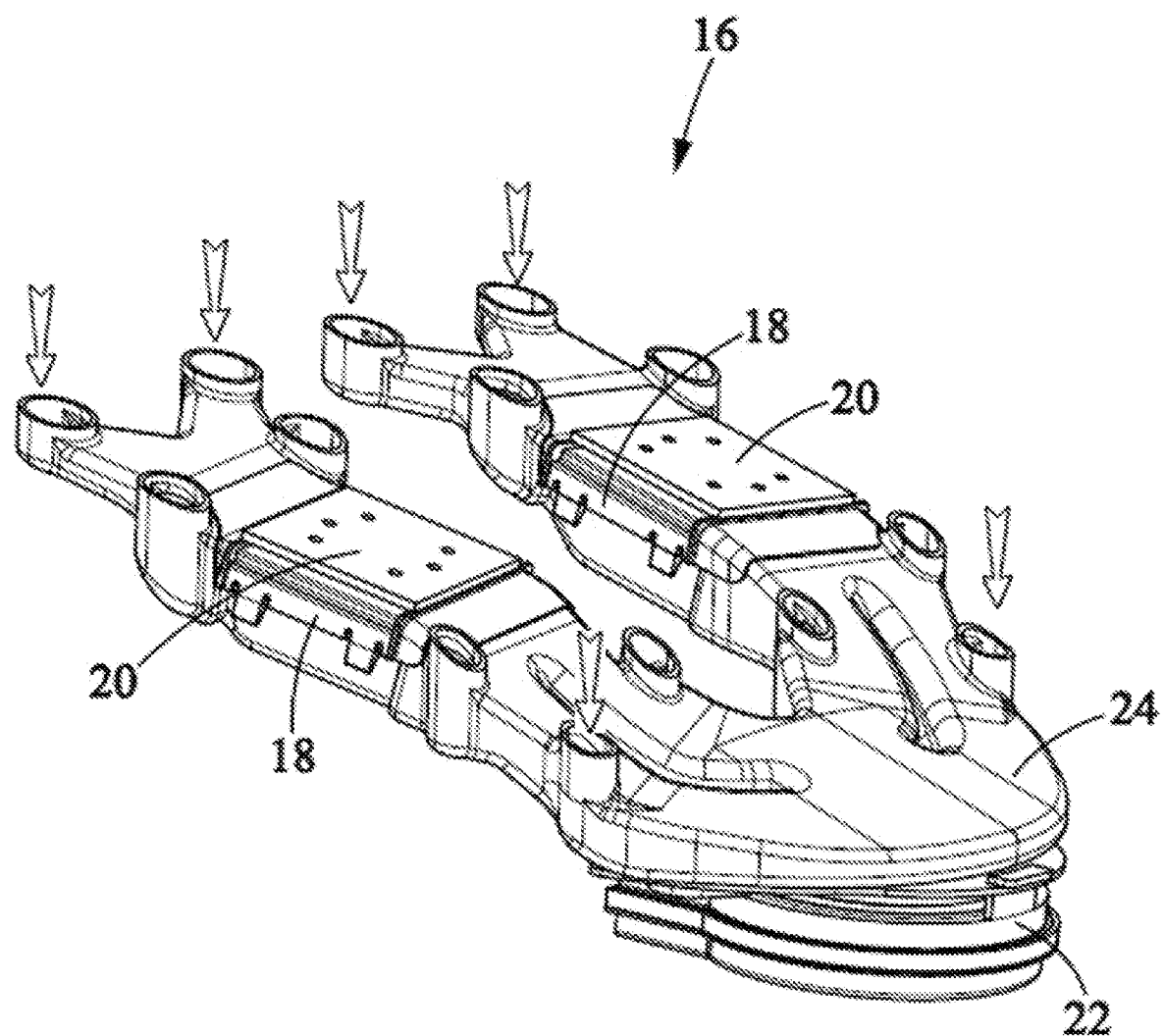
FIGS. 7, 8, 9 and 10 show a perspective view of other embodiments of a ventilation and thermal control system constructed according to the invention.

In an example such as shown in FIG. 7, the ventilation system has two rigid type thermoelectric modules 20. Each thermoelectric module 20 is matched with a respective heat exchanger 18 incorporated in the conduit 24.

Figure 8:
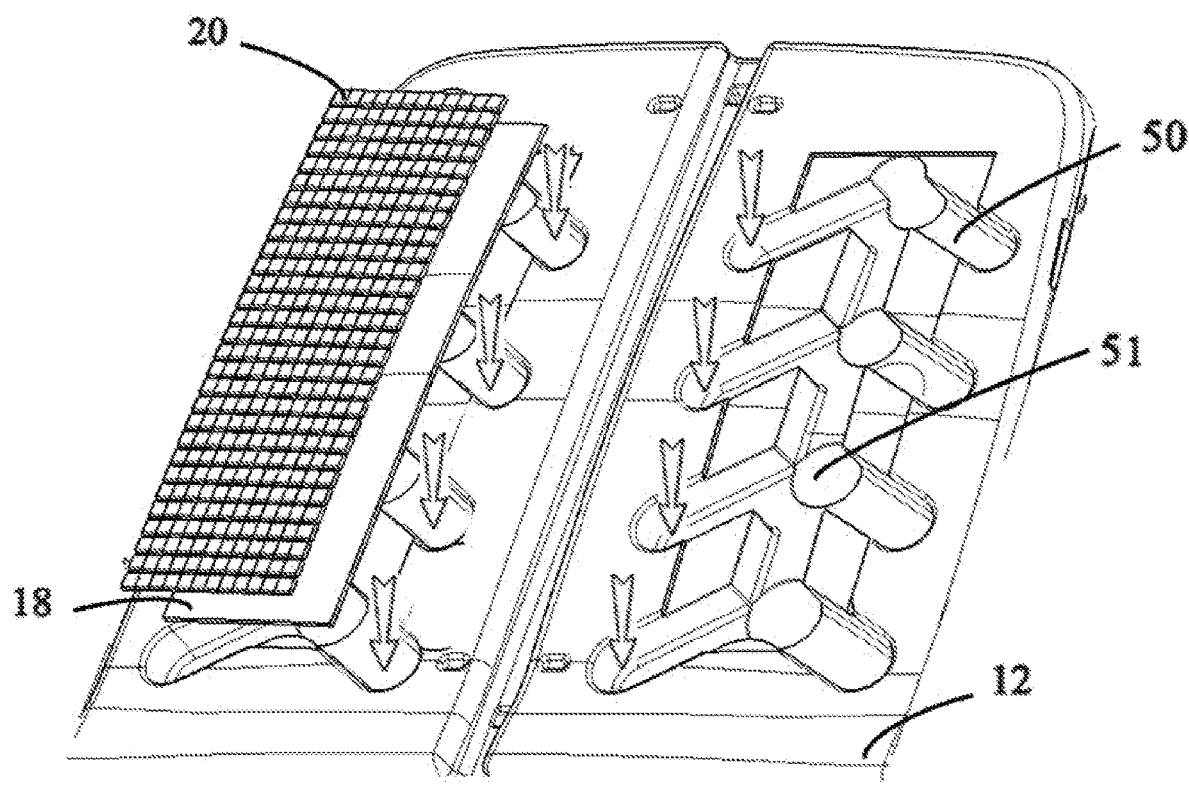

According to another example as shown in FIG. 8, the ventilation and thermal control system 16 has two thermoelectric modules 20 of flexible or semi-flexible type, with which to thereby increase the surface of the thermoelectric module beyond 2500 mm$^2$. Because of the large size of this thermoelectric module 20 and being flexible or semi-flexible type, it is possible to arrange it closer to the cover 11. Further, the heat exchanger 18 matched which each thermoelectric module 20 can be simplified and integrated in the padding 12. The flow of air with which to cool the thermoelectric module always comes from the cover 11, passes through cavities 50 of the padding 12, follows along the lower surface of the heat exchanger 18 and passes through wells 51 made in the padding 12. The wells 51 have a fluid connection with the conduit 24 (not shown) through the orifices 27 of the conduit 24.

In this example, the heat exchanger 18 is thin, for example thinner than a millimeter, in a material having a high thermal conductivity. This material can be graphene, but also copper, silver or alloys of these various materials.

Figure 9:
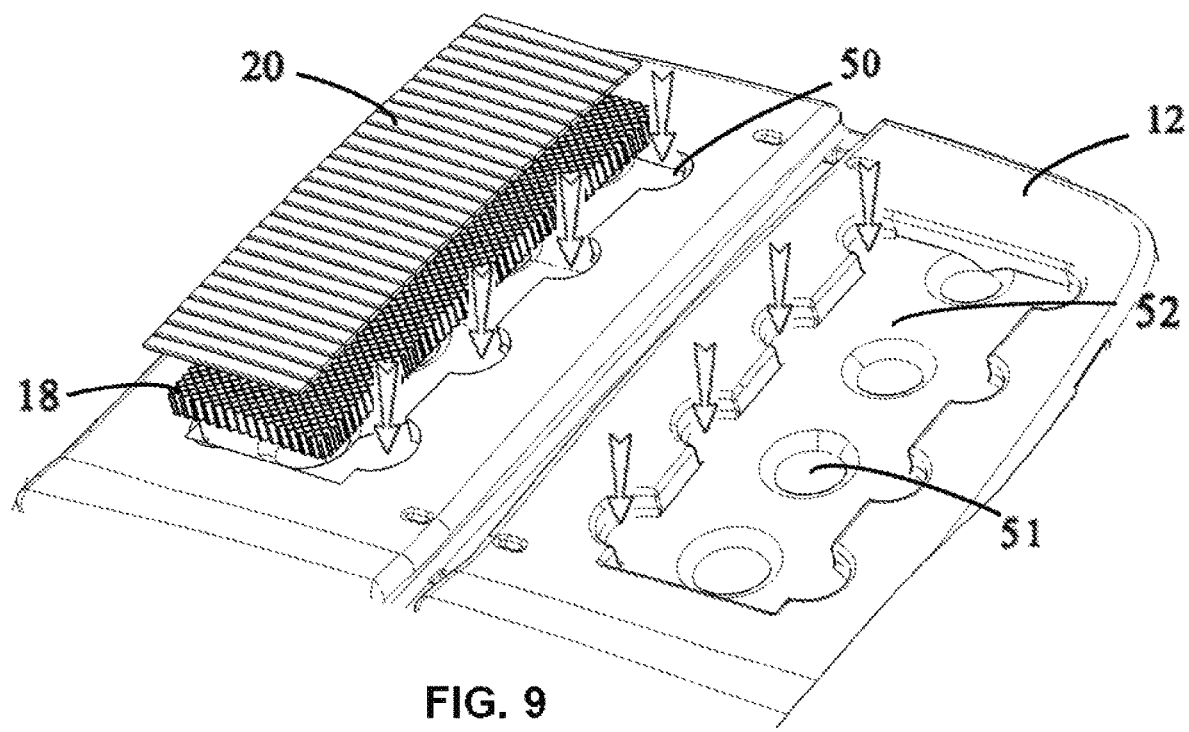

In another example as shown in FIG. 9, the ventilation and thermal control system 16 has two thermoelectric modules 20 of flexible or semi-flexible type, with which to thereby increase the surface of the thermoelectric module beyond 2500 mm$^2$. Because of the large size of this thermoelectric module 20 and being flexible or semi-flexible type, it is possible to arrange it closer to the cover 11. Further, the heat exchanger 18 matched which each thermoelectric module 20 can be simplified and integrated in the padding 12. The flow of air with which to cool the thermoelectric module 20 always comes from the cover 11, passes through cavities 50 of the padding 12, passes through the heat exchanger 18 and passes through wells 51 made in the padding 12. The wells 51 have a fluid connection with the conduit 24 (not shown) through the orifices 27 of the conduit 24.

In this example shown in FIG. 9, the heat exchanger 18 has a thickness of 5 to 20 mm and is placed in a cavity 52 with a depth equal to that of the heat exchanger 18. The heat exchanger 18 allows the passage of air tangentially because of the structure thereof made by a 3D grid fabric in order to increase the airflow under the heat exchanger 18. Additionally this 3D grid fabric can be made of a material having a high thermal conductivity in order to improve the cooling of the thermoelectric module 20, with this material can be graphene, copper, silver or alloys of these various materials.

Figure 10:
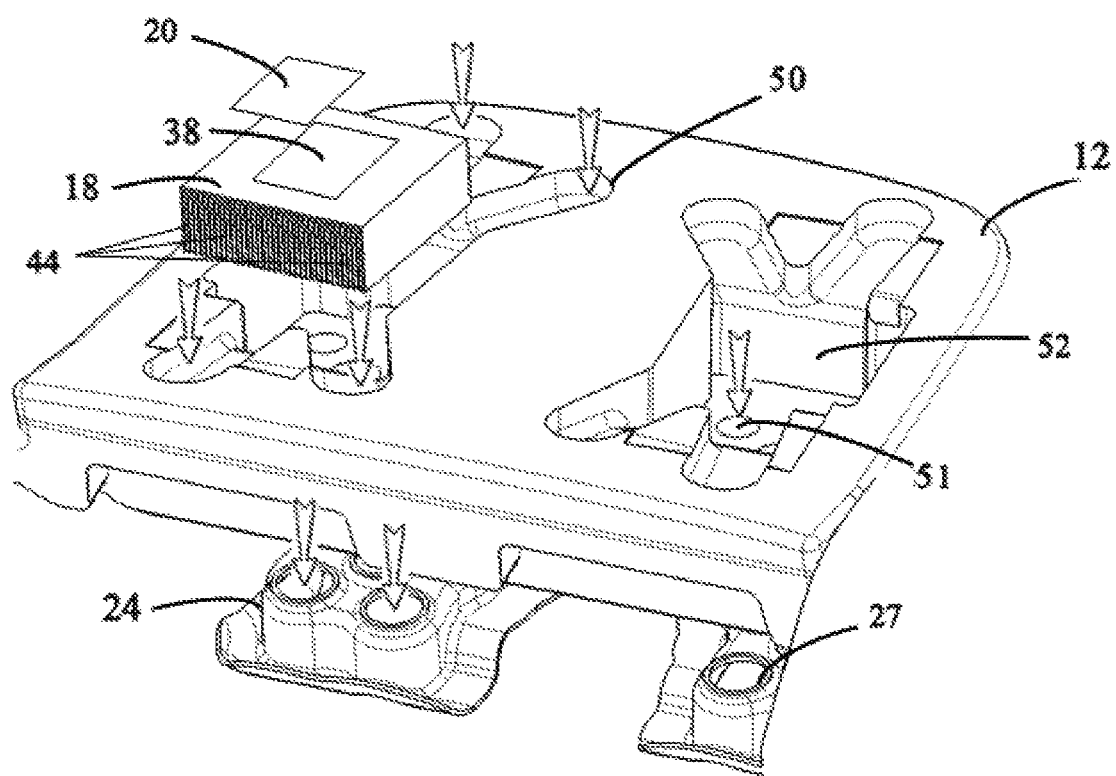

In the last example as shown in FIG. 10, the ventilation system comprises two, rigid type thermoelectric modules 20 positioned in each of the housings 38 present in the heat exchangers 18. The two heat exchangers 18 are positioned in cavities 52 made directly in the padding 12. The flow of air with which to cool the thermoelectric module 20 comes from the cover 11, passes through cavities 40 of the padding 12, passes between various fins 44 of the heat exchanger 18, and passes through wells 51 made in the padding 12. The wells 51 have a fluid connection with the conduit 24 through the orifices 27 thereof.

In this example, the heat exchanger 18 is composed of 10 to 30 flat fins 44, with a height included between 5 and 30 mm and a length from 30 to 70 mm. These fins 44 serve to increase the surface for exchange with the air which passes through the heat dissipator 18 and thus to improve the thermal diffusion capacity.

For all these examples, the airflow comes from the cover 11 aspirating system, and thus serves to evacuate humidity between the occupant and the cover 11 of the seat. Further, this airflow is used in whole or in part to cool the heat exchanger 18 connected to the thermoelectric module 20, which thus serves to have a local cooling of the cover 11 in addition to the ventilation thereof.

The invention claimed is:

1. A seat element comprising a cover and padding configured to serve as support for a user and a ventilation and thermal control system, the cover representing a surface of the seat element which is in contact with the user, where the ventilation and thermal control system comprises at least one thermoelectric module, a blower, and a conduit delimiting a passage for air connecting the blower and the thermoelectric module, wherein the ventilation and thermal control system is configured for passing a flow of air coming from the cover towards the blower, the air passing the blower being directed towards a side of the seat element opposite the cover, and where the thermoelectric module is configured for cooling and/or heating the airflow, wherein the seat element comprises at least one heat exchanger able to improve heat exchange between the thermoelectric module and the airflow, wherein an upper surface of the thermoelectric module is in contact with the padding, and a lower surface of the thermoelectric module is in contact with the heat exchanger, and wherein the air drawn from the cover is used to cool the heat exchanger and thereby cool the lower surface of the thermoelectric module.

2. The seat element according to claim 1, wherein the thermoelectric module is suited at least for heating the airflow.

3. The seat element according to claim 1, wherein the thermoelectric module is suited at least for cooling the airflow.

4. The seat element according to claim 1, wherein the thermoelectric module is configured for operating selectively according to two modes of operation: a heating mode where the thermoelectric module heats the airflow and a cooling mode where the thermoelectric module cools the airflow.

5. The seat element according to claim 1, wherein the heat exchanger is disposed in the conduit and the thermoelectric module is disposed between the heat exchanger and the padding.

6. The seat element according to claim 1, wherein the heat exchanger is disposed in the padding connected with the orifices of the conduit, and the thermoelectric module is disposed between the heat exchanger and the cover.

7. The seat element according to claim 1, wherein the heat exchanger comprises a housing receiving the thermoelectric module.

8. The seat element according to claim 1, wherein the ventilation and thermal control system comprises two thermoelectric modules and two heat exchangers where each of the two thermoelectric modules is respectively in contact with one of the heat exchangers.

9. The seat element according to claim 1 forming a seat bottom.

10. The seat element according to claim 1 forming a seat back.

11. The seat element according to claim 1, wherein the ventilation and thermal control system is configured for passing the flow of air through the cover towards the blower.

12. The seat element according to claim 1, wherein said passage is in fluidic communication with the surface of the seat element.

13. A seat for vehicle comprising a seat element, the seat element comprising a cover and padding configured to serve as support for a user and a ventilation and thermal control system, the cover representing a surface of the seat element which is in contact with the user, where the ventilation and thermal control system comprises at least one thermoelectric module, a blower, and a conduit delimiting a passage for air connecting the blower and the thermoelectric module, wherein the ventilation and thermal control system is configured for passing a flow of air coming from the cover towards the blower, the air passing the blower being directed towards a side of the seat element opposite the cover, and where the thermoelectric module is configured for cooling and/or heating the airflow, wherein the seat element comprises at least one heat exchanger able to improve heat exchange between the thermoelectric module and the airflow, wherein an upper surface of the thermoelectric module is in contact with the padding, and a lower surface of the thermoelectric module is in contact with the heat exchanger, and wherein the air drawn from the cover is used to cool the heat exchanger and thereby cool the lower surface of the thermoelectric module.

* * * * *